INVENTOR
OLIVER A. SHORT

United States Patent Office 3,547,835
Patented Dec. 15, 1970

3,547,835
PROCESSES OF PRODUCING AND APPLYING SILVER COMPOSITIONS, AND PRODUCTS THEREFROM
Oliver A. Short, Wilmington, Del., assignor to E. I. du Pont de Nemours and Company, Wilmington, Del., a corporation of Delaware
Continuation-in-part of applications Ser. No. 460,567, June 1, 1965, and Ser. No. 683,798, Nov. 17, 1967.
This application June 9, 1969, Ser. No. 835,884
Int. Cl. C03c 7/10; H01b 1/02
U.S. Cl. 252—514
13 Claims

ABSTRACT OF THE DISCLOSURE

Specified amounts of silver, inorganic binder and aluminum are admixed to produce conductive silver compositions. These compositions are applied to ceramic substrates and fired whereby the aluminum inhibits the formation of an oxidized layer between the silver and the substrate. Capacitors and thermistors having low resistance ohmic electrical contact(s) are also produced.

---

Figure 1:
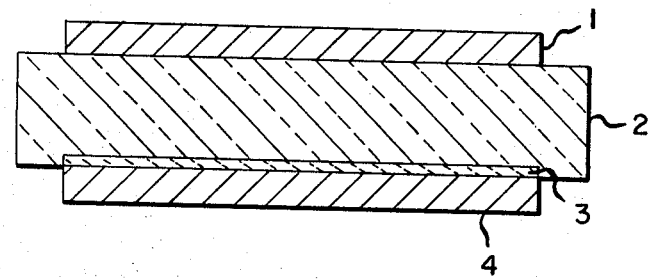

This application is a continuation-in-part of application Ser. No. 460,567, filed June 1, 1965 and now abandoned and application Ser. No. 683,798, filed Nov. 17, 1967, and now abandoned.

BACKGROUND OF THE INVENTION

Thermistors are ceramic resistor bodies whose electrical resistance are temperature dependent. Those whose resistances decrease with an increase in temperature are referred to as negative temperature coefficient (NTC) thermistors, while those whose resistances increase with an increase in temperature are referred to as positive temperature coefficient (PTC) thermistors. Thermistor bodies are generally bodies of fired ceramic semiconductors. In the case of the NTC thermistors, the latter are usually one or more metal oxides of a large group of metal oxides known to have semiconductive properties, some of the more commonly used being the oxides of metals such as manganese, nickel, cobalt, iron, zinc, vanadium, zirconium, cerium, chromium and uranium. The PTC thermistor bodies generally are fired alkaline earth titanates which have been "doped" by the addition of a small amount of an agent such as a rare earth oxide, e.g., cerium and/or yttrium oxide, for producing semiconductivity. Thermistors must be provided with electrically conductive contacts to which circuit leads may be attached.

The conductive contacts or electrodes applied to thermistor bodies should be low resistance, essentially ohmic contacts. Silver paints or pastes are, of course, widely known and used for providing fired-on conductive contacts or electrodes on ceramic objects. However, the silver paints now used commercially do not provide low resistance, ohmic contacts when fired onto semiconductive PTC bodies, the reason apparently being that sufficient oxygen penetrates through the paint coating during firing to provide an oxidized nonconducting or barrier layer between the fired-on coating or electrode and the semiconductive substrate. Another instance where the usual silver paint does not provide a low resistance ohmic contact or electrode is on the so-called "reduced" titanate bodies which are usually alkaline earth titanate bodies which have been heated in a reducing atmosphere to render them semiconductive. Thus, when a fired-on contact or electrode is provided on a reduced titanate body using a silver paint of the type described in Larsen and Short U.S. Patent 2,822,279 and consisting of a suspension of silver powder, bismuth oxide and an alkali metal-cadmium borate frit in an organic vehicle, the contact resistance will range from about 2,000,000 to 7,000,000 ohms. Liquid gallium-indium alloys are reported to produce what are regarded as ohmic contacts and such contacts are generally regarded as standards of reference. Since such gallium-indium contact on the same type of reduced titanate bodies have resistances of only 150,000 to 330,000 ohms, it is obvious by comparison that the much higher resistances of the contacts obtained using the Larsen and Short type silver paints are due to the "barrier layer" formed during firing between the contact coating and the reduced titanate substrate.

Accordingly, it is highly desirable to provide an improved silver composition which is especially useful for producing electrical contacts or electrodes on PTC thermistor or reduced titanate bodies in capacitors. It is particularly desirable to provide silver/aluminum compositions or paints which may be used to provide fired contact on such bodies, which contacts are comparable to those obtained using gallium-indium alloys.

SUMMARY OF THE INVENTION

This invention relates to a process of preparing a conductive silver composition comprising admixing, on a weight basis, 50–95% finely divided silver or compounds which on firing will produce 50–95% silver, 1–15% of a finely divided inorganic binder and 1–40% finely divided aluminum to inhibit the formation, during firing of said composition onto a substrate, of an oxidized layer between the silver and the substrate.

The compositions of the invention consist essentially of 50 to 95% silver, 1 to 40% aluminum and 1 to 15% inorganic binder. All proportions are on a weight basis and all components should be in a finely divided form. The preferred compositions consist essentially of 50 to 90% silver, 5 to 35% aluminum and 1 to 10% inorganic binder. The compositions will generally be applied to the thermistor or reduced titanate body as a suspension in an inert liquid vehicle.

The process of producing a conductive silver surface comprises applying a conductive silver composition to a ceramic substrate, and firing said composition onto the substrate wherein said composition comprises, on a weight basis, 50–95% finely divided silver, 1–15% of a finely divided inorganic binder and 1–40% finely divided aluminum to inhibit the formation, during firing of said composition, of an oxidized layer between the silver and the substrate.

DESCRIPTION OF THE PREFERRED EMBODIMENTS

The silver, aluminum and binder components should generally be in finely divided or powder form. An average particle size not exceeding about 40 microns is generally satisfactory, but for the silver component a particle size of 0.1 to 5 microns is preferred and for the binder component a particle size of 1 to 10 microns is preferred. As to the aluminum component, a particle size not exceeding 10 microns in diameter, e.g., 0.1 to 10 microns, is preferred. Most preferably, the particles of the aluminum powder will be in flake form. Such aluminum flake powders are well known and are available commercially.

The inorganic binder component, which serves as a binder for binding the silver coating to the substrate during firing may be any of the glass frits used as binders in conductive compositions. However, a wetting agent (e.g., bismuth oxide) may be employed along with such binders in formulating silver compositions. Suitable binders include: lead borate and borosilicate glass frits containing 30 to 90% PbO, 0 to 40% $SiO_2$ and 4 to 25% $B_2O_3$; cadmium borate glass frits containing 50 to 95% CdO, 5 to 50% $B_2O_3$ and 0 to 15% $SiO_2$; alkali metal-cadmium borate glass frits containing 5 to 10% alkali metal oxide, 55 to 80% CdO, 10 to 25% $B_2O_3$ and 0 to 20% $SiO_2$; lead fluoroborate glass frits containing 50 to 73% PbO, 5 to 30% $PbF_2$ and 13 to 27% $B_2O_3$; and lead silicate glass frits containing 50 to 90% PbO and 10 to 50% $SiO_2$.

The silver compositions of the invention will generally be dispersed in an inert vehicle to form a paint or paste for application to the thermistor or reduced titanate body. The proportions of the composition to vehicle may be varied considerably depending upon the manner in which the paint or paste is to be applied and to the kind of vehicle used. When application is to be made using a stencil screen, the weight ratio of the silver composition to vehicle will generally range from 1 to 5 parts of the composition per part of vehicle and the resulting paint or paste will have a viscosity of from 50,000 to 200,000 cps., preferably 80,000 to 100,000 cps., as measured on a Brookfield Viscosimeter at 25° C. and a spindle speed of about 10 r.p.m.

Any inert liquid may be employed as the vehicle. Examples are water and various organic liquids, with or without thickening and/or stabilizing agent and other common additives. Examples of the preferred organic vehicles that can be used are the alcohols such as methyl, ethyl, propyl, butyl and higher alcohols; esters of such alcohols, for example, the acetates and propionates; terpenes and resins such as pine oil, alpha- and beta-terpineol and the like; and solutions of resins such as the polymethacrylate of lower alcohols, or of ethyl cellulose, in solvents such as pine oil and the monobutyl ether monoacetate of ethylene glycol (butyl-O—$CH_2CH_2$—$OOCCH_3$). The vehicle may contain or be composed of volatile liquids to promote fast setting after application, or they may contain waxes, thermoplastic resins or the like materials which are thermofluid, so that the vehicle composition may be applied at an elevated temperature to a relatively cold thermistor body upon which the composition sets immediately.

Application of the contact composition in paint or paste form to the thermistor may be effected in any desired manner. It will generally be desired, however, to effect the application in precise pattern form, which can be readily done employing well known screen stencil techniques or methods. The resulting contact print or pattern will then be fired in the usual manner at a temperature of from about 650 to 820° C. (1200 to 1500° F.) in an air atmosphere employing the usual firing lehr.

A preferred and typical silver composition was prepared by mixing together a silver powder of 0.1 to 2.0 microns particle size, a commercial flake aluminum powder of particle size less than 10 microns and a lead borate glass frit of particle size of about 1 to 5 microns. The resulting composition contained, on a weight basis, 65.7% silver, 31.8% aluminum and 2.5% frit. The frit contained 76% PbO and 24% $B_2O_3$, by weight. A silver paint was prepared by suspending 61.2 parts by weight of the composition in 28.8 parts by weight of a vehicle which was a 10% solution of ethyl cellulose (viscosity, about 200 cps.) in beta-terpineol.

The above paint was employed to provide fired-on contacts on PTC thermistor wafers. The resistances of the resulting contacts were about 50,000 ohms. When contacts were applied to the same type wafers using a 50/50 gallium-indium alloy under essentially the same conditions, the resistances of the resulting contacts were about 50,000 ohms, or essentially the same as the contacts made from the above silver/aluminum paint. In contrast, the resistances of contacts on the same type of wafer, applied under essentially the same conditions except that the silver paint used was of the conventional type described in Larsen and Short U.S. Patent 2,822,279 and contained about 26.8% of the vehicle, 62% silver powder, 8.9% $Bi_2O_3$ and 2.3% of an alkali metal-cadmium borate frit, were about 5,000,000 ohms.

The above contacts made using the silver-aluminum composition were not directly solderable. However, when a corresponding silver paint which was free of aluminum and frit, was printed over and fired on the initial contact, the resulting contact, whose resistance remained unchanged, could be readily soldered, e.g., by simply immersing in a solder bath consisting of 62% Sn, 36% Pb and 2% Ag.

When a reduced barium titanate wafer was provided with fired-on electrodes (one each side) using the above silver/aluminum paint, the resulting electroded wafer had a resistance of only 0.8 ohm. When a similar electroded wafer was prepared using the above Larsen and Short type paint, the resistance of the electroded wafer was 100,000 ohms. This is a striking example of the low resistance ohmic type contact resulting from the present silver/aluminum compositions. Use of the present silver/aluminum compositions to produce an ohmic contact electrode on one side of a reduced barium titanate body and a Larsen and Short type silver paint to produce a silver electrode on the other side, has been used in forming a so-called "one-sided" capacitor in which a doubling of the capacitance, e.g., 400,000 picofarads to 800,000 picofarads results. Such a capacitor has strong rectifying properties and must be used in a polarized circuit. Such rectifiers have been made with resistances in one direction of 30,000 ohms and in the reverse direction of 50 ohms. Under constant voltage, front to back current ratios were 220 ma. to 1 ma.

Figure 2:
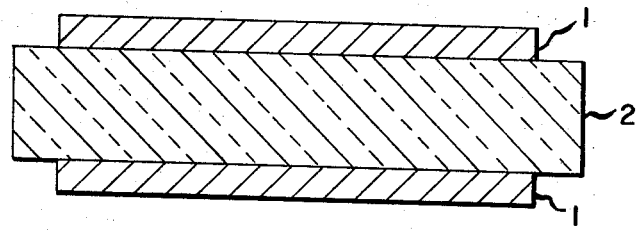

Thus, another aspect of this invention includes reduced titanate capacitors comprising a conventional silver electrode on one side of a barium titanate substrate and the present silver/aluminum electrode on the other side of the barium titanate substrate. This is illustrated by FIG. 1 where the capacitor comprises a silver/aluminum metal electrode 1, barium titanate substrate 2, an oxidized layer of the substrate 3 and silver electrode 4. Also, ceramic thermistor bodies comprising silver/aluminum contacts on both sides are within the purview of this invention. This is illustrated by FIG. 2 which comprises a barium titanate substrate 2 and silver/aluminum electrode 1.

In the novel conductor compositions of this invention, aluminum is the important constituent which overcomes the prior art difficulties concerning a barrier layer between the silver and the substrate. It is theorized that the aluminum functions as a reducing agent to prevent or inhibit the formation during firing of an oxidized layer (barrier layer) between the silver coating and the substrate. However, many other reducing agents such as iron, zinc, copper, lead, molybdenum, chromium, magnesium and nickel, when tried in place of aluminum, did not give the same effect as does aluminum in that the resulting fired-on contacts were far from being low resistance ohmic contacts.

It is important that the present silver aluminum compositions contain from 1 to 40% aluminum, since when the aluminum content is less than 1% there is not sufficient aluminum present to maintain the required reducing environment. However, it is preferred to have more than 1% aluminum present to provide more desirable results. When the aluminum content is greater than about 40%, the electrical resistance of the fired-on contact or electrode becomes excessive.

I claim:

1. A process of preparing a conductive silver composition comprising admixing, on a weight basis, 50–95% finely divided silver or compounds which on firing will produce 50–95% silver, 1–15% of a finely divided inorganic binder and 1–40% finely divided aluminum to inhibit the formation, during firing of said composition onto a substrate, of an oxidized layer between the silver and the substrate.

2. A process in accordance with claim 1 wherein 50–90% silver, 1–10% inorganic binder and 5–35% aluminum are admixed.

3. A process in accordance with claim 1 wherein the inorganic binder is a glass frit selected from the group consisting of lead borate and lead borosilicate frits, cadmium borate frits, alkali metal-cadmium borate frits, lead fluoroborate frits, and lead silicate frits.

4. A process in accordance with claim 1 wherein an inert liquid vehicle is also admixed to disperse and suspend the finely divided silver, aluminum and binder.

5. A conductive silver composition consisting essentially of, on a weight basis, 50–95% finely divided silver or compounds which on firing will produce 50–95% silver, 1–15% of a finely divided inorganic binder and 1–40% finely divided aluminum to inhibit the formation, during firing of said compositions onto a substrate, of an oxidized layer between the silver and the substrate.

6. A conductive silver composition in accordance with claim 5 which is dispersed in an inert liquid vehicle.

7. A process in accordance with claim 5 wherein the inorganic binder is a glass frit selected from the group consisting of lead borate and lead borosilicate frits, cadmium borate frits, alkali metal-cadmium borate frits, lead fluoroborate frits, and lead silicate frits.

8. A conductive silver composition consisting essentially of, on a weight basis, 50–90% finely divided silver or compounds which on firing will produce 50–90% silver, 1–10% of a finely divided inorganic binder and 5–35% finely divided aluminum to inhibit the formation, during firing of said composition onto a substrate, of an oxidized layer between the silver and the substrate.

9. A conductive silver composition in accordance with claim 8 which is dispersed in an inert liquid vehicle.

10. A process in accordance with claim 8 wherein the inorganic binder is a glass frit selected from the group consisting of lead borate and lead borosilicate frits, cadmium borate frits, alkali metal-cadmium borate frits, lead fluoroborate frits, and lead silicate frits.

11. A process of producing a conductive silver surface comprising applying a conductive silver composition to a ceramic substrate, and firing said composition onto the substrate wherein said composition comprises, on a weight basis, 50–95% finely divided silver, 1–15% of a finely divided inorganic binder and 1–40% finely divided aluminum to inhibit the formation, during firing of said composition, of an oxidized layer between the silver and the substrate.

12. An electrical device having ohmic contacts consisting essentially of 50–95% silver, 1–15% of an inorganic binder and 1–40% aluminum.

13. An electrical device having at least one ohmic contact which consists essentially of 50–95% silver, 1–15% of an inorganic binder and 1–40% aluminum.

References Cited

UNITED STATES PATENTS

| | | | |
|---|---|---|---|
| 3,162,551 | 12/1964 | Short | 252—514 |
| 3,207,706 | 9/1965 | Hoffman | 252—514 |

DOUGLAS J. DRUMMOND, Primary Examiner

U.S. Cl. X.R.

117—227; 338—22